(12) United States Patent
Ren

(10) Patent No.: US 11,685,973 B2
(45) Date of Patent: Jun. 27, 2023

(54) CORROSION RESISTANT HIGH STRENGTH BRAZING SHEET

(71) Applicant: ARCONIC TECHNOLOGIES LLC, Pittsburgh, PA (US)

(72) Inventor: Baolute Ren, Lititz, PA (US)

(73) Assignee: ARCONIC TECHNOLOGIES LLC, Pittsburgh, PA (US)

(*) Notice: Subject to any disclaimer, the term of this patent is extended or adjusted under 35 U.S.C. 154(b) by 0 days.

(21) Appl. No.: 17/253,325

(22) PCT Filed: Jun. 21, 2018

(86) PCT No.: PCT/US2018/038852
§ 371 (c)(1),
(2) Date: Dec. 17, 2020

(87) PCT Pub. No.: WO2019/245570
PCT Pub. Date: Dec. 26, 2019

(65) Prior Publication Data
US 2021/0269897 A1    Sep. 2, 2021

(51) Int. Cl.
| | | |
|---|---|---|
| *B32B 15/01* | (2006.01) | |
| *C22C 21/02* | (2006.01) | |
| *B22D 7/00* | (2006.01) | |
| *B23K 35/02* | (2006.01) | |
| *B23K 35/28* | (2006.01) | |

(Continued)

(52) U.S. Cl.
CPC .............. *C22C 21/02* (2013.01); *B22D 7/005* (2013.01); *B23K 35/0238* (2013.01); *B23K 35/286* (2013.01); *C21D 8/0236* (2013.01); *C21D 9/46* (2013.01); *C22C 21/16* (2013.01); *C22C 21/18* (2013.01); *B23K 2101/18* (2018.08); *B23K 2103/10* (2018.08); *C22C 21/14* (2013.01)

(58) Field of Classification Search
None
See application file for complete search history.

(56) References Cited

U.S. PATENT DOCUMENTS

| | | | |
|---|---|---|---|
| 4,649,087 A | 3/1987 | Scott et al. | |
| 4,828,794 A | 5/1989 | Scott et al. | |

(Continued)

FOREIGN PATENT DOCUMENTS

| | | | |
|---|---|---|---|
| EP | 2065180 A1 | 6/2009 | |
| EP | 2418042 | * 2/2012 | |

(Continued)

OTHER PUBLICATIONS

International Preliminary Report on Patentability for International Application No. PCT/US2018/038852 dated Dec. 22, 2020.

(Continued)

*Primary Examiner* — Daniel J. Schleis
(74) *Attorney, Agent, or Firm* — K&L Gates LLP

(57) ABSTRACT

An apparatus, material and method for forming a brazing sheet has a high strength core bonded with corrosion protection layer on the coolant side and/or layers on both airside and coolant side. The material enables heat exchanger components, such as tube, header, plate, etc., for applications, such as automotive heat exchangers, that require high fatigue life as well as high service life in a corrosive environment.

19 Claims, 5 Drawing Sheets

(51) Int. Cl.
  *C21D 8/02* (2006.01)
  *C21D 9/46* (2006.01)
  *C22C 21/16* (2006.01)
  *C22C 21/18* (2006.01)
  *B23K 103/10* (2006.01)
  *B23K 101/18* (2006.01)
  *C22C 21/14* (2006.01)

(56) References Cited

U.S. PATENT DOCUMENTS

| | | | |
|---|---|---|---|
| 5,744,255 A * | 4/1998 | Doko | B23K 35/286 |
| | | | 165/905 |
| 9,964,364 B2 | 5/2018 | Ren | |
| 10,486,269 B2 * | 11/2019 | Jacoby | C22C 21/14 |
| 2005/0011636 A1 | 1/2005 | Miyachi et al. | |
| 2008/0011816 A1 | 1/2008 | Kilmer | |
| 2011/0100615 A1 | 5/2011 | Henry et al. | |
| 2014/0134458 A1 | 5/2014 | Fukumoto | |
| 2016/0169600 A1 | 6/2016 | Fukumoto et al. | |
| 2016/0250720 A1 * | 9/2016 | Ren | C22C 21/16 |
| | | | 428/654 |
| 2016/0326614 A1 | 11/2016 | Narita et al. | |
| 2017/0115076 A1 | 4/2017 | Sakashita | |

FOREIGN PATENT DOCUMENTS

| | | | | |
|---|---|---|---|---|
| EP | 2129520 B1 * | 7/2013 | | B32B 15/016 |
| EP | 2832873 A1 | 2/2015 | | |
| EP | 1753885 B1 | 12/2016 | | |
| EP | 3124631 B1 | 10/2018 | | |
| JP | 20050523164 | 8/2005 | | |
| JP | 2011042853 | 3/2011 | | |
| JP | 2014098185 | 5/2014 | | |
| JP | 2017082266 | 5/2017 | | |
| WO | 03089237 A1 | 10/2003 | | |
| WO | 2004112992 A2 | 12/2004 | | |
| WO | 2013146686 A1 | 10/2013 | | |
| WO | 2014017976 A1 | 1/2014 | | |
| WO | 2015001725 A1 | 1/2015 | | |
| WO | 2016045973 A1 | 3/2016 | | |
| WO | 2016/134967 A1 | 9/2016 | | |
| WO | WO2016134967 * | 9/2016 | | |

OTHER PUBLICATIONS

International Search Report and Written Opinion for International Application No. PCT/US2018/038852 dated Mar. 4, 2019.

* cited by examiner

CORROSION RESISTANT HIGH STRENGTH BRAZING SHEET

FIELD

The present invention relates to brazing sheet materials, heat exchangers, methods for making same and more particularly, to materials used for making heat exchangers from aluminum alloy brazing sheet that is formed into heat exchanger components that are unified into an assembly by brazing.

BACKGROUND

Various apparatus, materials and methods for making heat exchangers are known. Aluminum heat exchangers, such as radiators, condensers, heater cores, charge air coolers, etc. are mainly assembled using brazing technologies, including controlled atmosphere brazing (CAB) and vacuum brazing. In the brazing process, a braze liner layer of a composite brazing sheet is melted by exposure to high temperatures, e.g., in a furnace, and serves as filler metal to form a braze joint between the heat exchanger components, such as tube and header, tube and fin, etc.

One major trend in the market for heat exchanger materials has been a movement towards lighter gauges, which require high strength while maintaining corrosion resistance. The 3xxx aluminum alloys traditionally used for the heat exchanger applications have associated strength limitations. It is well known that Mg is an alloying element that strengthens aluminum alloys, but Mg has limited application for materials that are brazed using controlled atmosphere brazing (CAB) due to the negative effect that Mg has on brazeability. The use of Mg for strengthening is also limited due to properties exhibited when Mg containing alloys are overaged at elevated service temperatures. Overaging can result in pulling Mg out of solution within the alloy resulting in coarsening of the precipitates and a lowering of strength in a fully overaged material.

Cu is another alloying element that has been widely used in applications that require high strength, such as aerospace applications. Some efforts have been made to use high Cu containing alloys in the heat exchanger applications. Wataru Narita and Atsushi Fukumoto disclosed high Cu addition with Mg at a ratio of Cu/Mg 4-8 (US 2016/0326614 A1). Kimura et al disclosed high Cu alloy with Mg to reach high strength and high Zn containing sacrificial layer for internal corrosion (EP 3 124 631 A1). Tsuruno et al disclosed high Cu alloy for high strength (EP 1 753 885 B1).

Notwithstanding known methods, materials and apparatus, alternative methods, apparatus and materials for making heat exchangers remain desirable.

SUMMARY

The disclosed subject matter relates to a sheet material with an aluminum alloy core, having 0.1 to 1.2 wt % Si; up to 0.6 wt % Fe, 1.0 to 2.6 wt % Cu; 0.5 to 1.8 wt % Mn, up to 0.6 wt % Mg; 0.05 to 1.0 wt % Zn, up to 0.2 wt % Ti; up to 0.2 wt % Zr and a 4XXX aluminum alloy braze liner having 6 to 13 wt % Si; up to 0.8 wt % Fe, up to 0.3 wt % Cu; up to 0.2 wt % Mn, up to 2.0 wt % Mg; up to 4.0 wt % Zn.

In accordance with another aspect of the present disclosure, the Zn of the core forms second phase particles which alter the corrosion potential difference between the matrix of the core and the second phase particles.

In accordance with another aspect of the present disclosure, the Zn of the core forms at least one of $Cu_5Zn_2Al$, $Cu_3ZnAl_3$ or another of Al—Cu—Zn/Al—Cu—Mg—Zn phases.

In accordance with another aspect of the present disclosure, the core has 0.1 to 1.0 wt % Si; up to 0.6 wt % Fe, 1.0 to 2.4 wt % Cu; 0.5 to 1.7 wt % Mn, up to 0.6 wt % Mg; 0.05 to 1.0 wt % Zn, up to 0.2 wt % Ti; and up to 0.2 wt % Zr In accordance with another aspect of the present disclosure, the core has 0.1 to 0.8 wt % Si; up to 0.6 wt % Fe, 1.2 to 2.3 wt % Cu; 0.5 to 1.5 wt % Mn, up to 0.4 wt % Mg; 0.05 to 0.8 wt % Zn, up to 0.18 wt % Ti; and up to 0.18 wt % Zr.

In accordance with another aspect of the present disclosure, further including a waterside liner with 0.1 to 1.2 wt % Si; up to 1.0 wt % Fe, up to 0.3 wt % Cu; up to 1.5 wt % Mn, up to 0.6 wt % Mg; 0.5 to 12 wt % Zn, up to 0.16 wt % Ti; and up to 0.16 wt % Zr; and wherein the core has 0.05 to 0.8 wt % Si; up to 0.6 wt % Fe, 1.2 to 2.3 wt % Cu; 0.5 to 1.5 wt % Mn, up to 0.4 wt % Mg; 0.1 to 0.8 wt % Zn, up to 0.18 wt % Ti; and up to 0.18 wt % Zr.

In accordance with another aspect of the present disclosure, further including a waterside liner with 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; and up to 0.16 wt % Zr; and wherein the core has 0.1 to 0.8 wt % Si; up to 0.5 wt % Fe, 1.2 to 2.3 wt % Cu; 0.5 to 1.5 wt % Mn, up to 0.35 wt % Mg; 0.05 to 0.8 wt % Zn, up to 0.2 wt % Ti; and up to 0.2 wt % Zr.

In accordance with another aspect of the present disclosure, further including a waterside liner with 0.1 to 1.2 wt % Si; up to 0.8 wt % Fe, up to 0.1 wt % Cu; up to 1.3 wt % Mn, up to 0.5 wt % Mg; 0.5 to 10 wt % Zn, up to 0.1 wt % Ti; and up to 0.1 wt % Zr; and wherein the core has 0.1 to 0.8 wt % Si; up to 0.5 wt % Fe, 1.2 to 2.3 wt % Cu; 0.5 to 1.4 wt % Mn, up to 0.3 wt % Mg; 0.05 to 0.8 wt % Zn, up to 0.18 wt % Ti; and up to 0.18 wt % Zr.

In accordance with another aspect of the present disclosure, the 4XXX aluminum alloy braze liner is a first 4XXX braze liner and further including a second 4XXX braze liner disposed on the core distal to the first 4XXX braze liner, the second 4XXX braze liner having 6 to 13 wt % Si; up to 0.8 wt % Fe, up to 0.3 wt % Cu; up to 0.2 wt % Mn, up to 2.0 wt % Mg; up to 4.0 wt % Zn and wherein the core comprises 0.1 to 0.8 wt % Si; up to 0.5 wt % Fe, 1.2 to 2.3 wt % Cu; 0.5 to 1.4 wt % Mn, up to 0.3 wt % Mg; 0.05 to 0.8 wt % Zn, up to 0.18 wt % Ti; and up to 0.18 wt % Zr.

In accordance with another aspect of the present disclosure, further including a waterside liner and an interliner positioned between the core and the braze liner.

In accordance with another aspect of the present disclosure, the interliner has up to 0.3 wt % Si; up to 0.5 wt % Fe, 0.1 to 1.0 wt % Cu; 0.5 to 1.8 wt % Mn, up to 0.3 wt % Mg; up to 0.25 wt % Zn, up to 0.25 wt % Ti; and up to 0.25 wt % Zr, wherein the waterside liner has 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; and up to 0.16 wt % Zr, and wherein the core has 0.1 to 1.0 wt % Si; up to 1.0 wt % Fe, 1.0 to 2.5 wt % Cu; 0.5 to 1.8 wt % Mn, up to 0.6 wt % Mg; 0.05 to 1.0 wt % Zn, up to 0.2 wt % Ti; and up to 0.2 wt % Zr.

In accordance with another aspect of the present disclosure, the interliner has up to 0.2 wt % Si; up to 0.5 wt % Fe, 0.3 to 0.9 wt % Cu; 0.5 to 1.8 wt % Mn, up to 0.35 wt % Mg; up to 0.2 wt % Zn, up to 0.18 wt % Ti; and up to 0.18 wt % Zr, wherein the waterside liner has 0.1 to 1.0 wt % Si; up to 1.0 wt % Fe, up to 0.2 wt % Cu; up to 1.2 wt % Mn, up to 0.5 wt % Mg; 0.5 to 10 wt % Zn, up to 0.1 wt % Ti; and up to 0.1 wt % Zr, and wherein the core has 0.1 to 0.8 wt % Si; up to 0.5 wt % Fe, 1.0 to 2.5 wt % Cu; 0.5 to 1.6 wt % Mn, up to 0.3 wt % Mg; 0.05 to 0.8 wt % Zn, up to 0.18 wt % Ti; and up to 0.18 wt % Zr.

In accordance with another aspect of the present disclosure, the interliner has up to 0.15 wt % Si; up to 0.4 wt % Fe, 0.2 to 0.9 wt % Cu; 0.5 to 1.7 wt % Mn, up to 0.3 wt % Mg; up to 0.15 wt % Zn, up to 0.16 wt % Ti; and 0.1 to 0.16 wt % Zr, wherein the waterside liner has 0.1 to 1.0 wt % Si; up to 0.9 wt % Fe, up to 0.2 wt % Cu; up to 1.4 wt % Mn, up to 0.5 wt % Mg; 0.5 to 8 wt % Zn, up to 0.1 wt % Ti; and up to 0.1 wt % Zr, and wherein the core has 0.1 to 0.8 wt % Si; up to 0.5 wt % Fe, 1.0 to 2.3 wt % Cu; 0.5 to 1.5 wt % Mn, up to 0.3 wt % Mg; 0.05 to 0.8 wt % Zn, up to 0.18 wt % Ti; and up to 0.18 wt % Zr.

In accordance with another aspect of the present disclosure, a heat exchanger has at least one tube capable of conducting a fluid therethrough and at least one fin in heat conductive contact with the tube, the tube having a core with 0.1 to 1.2 wt % Si; up to 0.6 wt % Fe, 1.0 to 2.6 wt % Cu; 0.5 to 1.8 wt % Mn, up to 0.6 wt % Mg; 0.05 to 1.0 wt % Zn, up to 0.2 wt % Ti; and up to 0.2 wt % Zr; and a 4XXX aluminum alloy braze liner, with 6 to 13 wt % Si; up to 0.8 wt % Fe, up to 0.3 wt % Cu; up to 0.2 wt % Mn, up to 2.0 wt % Mg; up to 4.0 wt % Zn, the fin being an aluminum alloy with a Zn addition, the Zn of the core reducing the corrosion potential difference between the tube and the fin.

In accordance with another aspect of the present disclosure, the fin alloy is 3003+Zn/3003mod and the Zn addition ≥0.5 wt %.

In accordance with another aspect of the present disclosure, a method for making a sheet material having an interliner with up to 0.3 wt % Si; up to 0.5 wt % Fe, 0.1 to 1.0 wt % Cu; 0.5 to 1.8 wt % Mn, up to 0.3 wt % Mg; up to 0.25 wt % Zn, up to 0.25 wt % Ti; and up to 0.25 wt % Zr, a waterside liner with 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; and up to 0.16 wt % Zr, a core with 0.1 to 1.0 wt % Si; up to 1.0 wt % Fe, 1.0 to 2.5 wt % Cu; 0.5 to 1.8 wt % Mn, up to 0.6 wt % Mg; 0.05 to 1.0 wt % Zn, up to 0.2 wt % Ti; and up to 0.2 wt % Zr, and a 4XXX braze liner, includes the steps of: casting the ingots for the interliner, the waterside liner, the core and the braze liner; subjecting the ingots for the interliner, the waterside liner, the core and the braze liner to a preheat in a temperature range of 400-560° C. for a soak time of up to 6 hours; rolling the ingots for the interliner, the waterside liner, the core and the braze liner to form stackable laminae; stacking the laminae into a composite; and rolling the composite to form the sheet material.

In accordance with another aspect of the present disclosure, the step of rolling of the composite is conducted at a temperature of 400-520° C.

In accordance with another aspect of the present disclosure, the step of rolling the composite is conducted at room temperature.

In accordance with another aspect of the present disclosure, the step of rolling the composite is conducted by cold rolling to an intermediate gauge followed by an intermediate anneal at a temperature in the range of 340-420° C., followed by cold rolling to a final gauge.

In accordance with another aspect of the present disclosure, the processes of cold rolling and intermediate annealing are conducted a plurality of times before cold rolling to a final gauge. In accordance with another aspect of the present disclosure, the step of rolling the composite is conducted by cold rolling directly to a final gauge and then subjected to a final anneal in a temperature range of 150-420° C.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

An aspect of the present disclosure is the recognition of the benefits of including copper in a core portion of an aluminum alloy brazing sheet. Cu in the core can result in increases in strength of the core, but also has implications on the corrosion resistance of the core, the brazing sheet and other portions of a heat exchanger in which the brazing sheet is used. Aspects of the present disclosure pertain to approaches and formulations that enhance the system corrosion properties of heat exchangers and materials with Cu-containing cores. More particularly, high Cu containing alloys are susceptible to corrosion due to the formation intermetallic particles, such as Al—Cu particles and, with Mg addition, Al—Cu—Mg particles. These intermetallic particles strengthen the alloys that contain them, but establish a corrosion potential difference relative to the core matrix in which they are present that promotes galvanic corrosion. High Cu additions to core material can also cause the resultant alloy to be more cathodic and increase the difference in corrosion potential between the heat exchanger components, such as between tube(s) and fin(s). Typically, fin material is designed to be anodic to the tube and end plate materials (made from brazing sheet) of a heat exchanger to provide sacrificial protection of the tubes and end plates. However, if the corrosion potential difference becomes too large attributable to the Cu content of the core of the brazing sheet material, corrosion of the fins can be accelerated, leading to premature corrosion damage of the fin, decreased corrosion protection by the fin of the tube, reduction of the mechanical integrity provided by the assembly of the fins to the tubes, and associated diminishment of heat transfer efficiency. In accordance with the present disclosure, the corrosion potential difference between high Cu containing brazing material structures, such as tubes, and adjacent fins may be adjusted to reduce fin corrosion.

In accordance with aspects of the present disclosure, the corrosion resistance of a brazing sheet having a high Cu content may be increased by a variety of ways, including, adding Zn to the core composition and/or by utilizing a multilayer architecture. In one embodiment, an interliner may be positioned between the braze liner and the core. The interliner may be of different types as described further below. Optionally, a waterside liner with low Cu content and/or a 4XXX braze liner may be positioned on the other side of the core from the airside braze liner. The waterside liner may also contain Zn to aid in corrosion prevention in addition to the Zn present in the Cu containing core.

Figure 1:
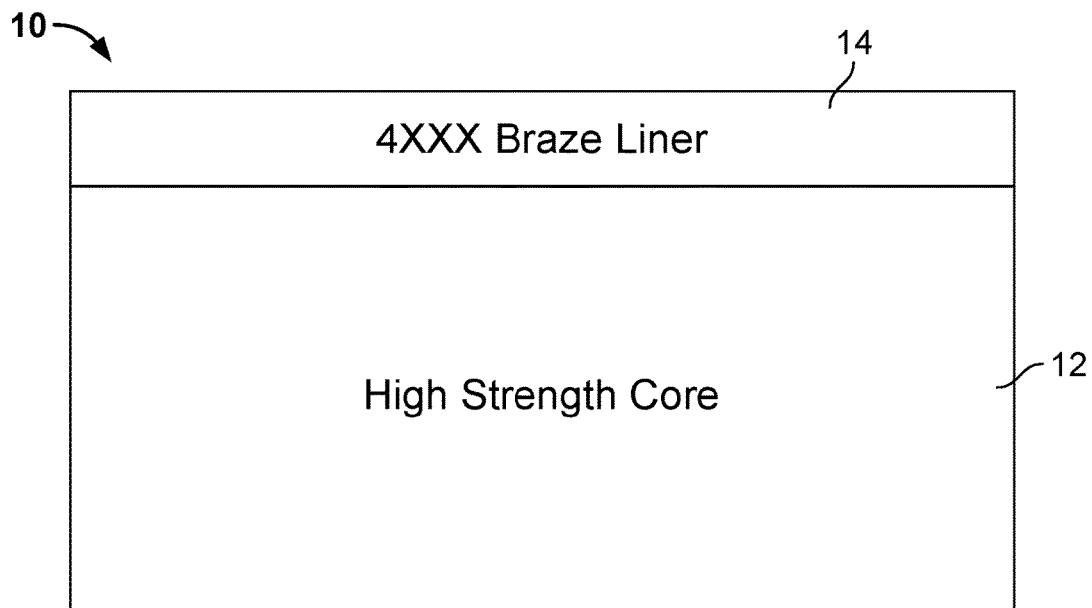
FIG. 1 is a diagrammatic view of a brazing sheet in accordance with an embodiment of the present disclosure.

FIG. 1 shows a brazing sheet material 10 with an aluminum alloy core 12 having a composition of 0.1 to 1.2 wt % Si; up to 0.6 wt % Fe, 1.0 to 2.6 wt % Cu; 0.5 to 1.8 wt % Mn, up to 0.6 wt % Mg; 0.05 to 1.0 wt % Zn, up to 0.2 wt % Ti; up to 0.2 wt % Zr. The brazing sheet 10 of FIG. 1 includes a braze liner 14 having a base composition of 4XXX (4000) series aluminum alloy. For example, having a composition of 6 to 13 wt % Si; up to 0.8 wt % Fe, up to 0.3 wt % Cu; up to 0.2 wt % Mn, up to 2.0 wt % Mg; up to 4.0 wt % Zn.

In each of the compositions for the core, braze liners and interliners disclosed in the present disclosure, the composition is an aluminum alloy expressed in weight percent of each listed element with aluminum and impurities as the remainder of the composition. The compositional ranges of the elements include all intermediate values as if expressed literally herein. For example, in the above composition, Si in the range of 0.1 to 1.2% includes, 0.1, 0.101, 0.102, 0.103, 0.199, etc. and all intermediate values, such as: 0.125, 0.15, 0.901, 1.101, etc., in increments of 0.001 from 0.100 to 1.200

In one example, the brazing sheet material 10 shown in FIG. 1 would be suitable for an air charge cooler/heat exchanger HE (diagrammatically depicted in FIG. 8) that operates in conjunction with a turbo charger or supercharger (not shown) to cool intake air to an internal combustion engine (not shown). Air charge coolers per se are known and commercially available. An air charge cooler could be formed from tubes T, end plates P and headers HD fabricated from the brazing sheet 10 and joined by brazing. The core layer 12 would form the interior surfaces IS1, IS2, IS3 of the tubes T, end plates P and headers HD, respectively, and the braze liner 14 would be on the exterior surfaces ES1, ES2, ES3 of the tubes T, end plates P and headers HD, respectively of the heat exchanger HE. The interaction of external fins EF and internal fins IF with the brazing sheet material 10 is described below. Engine intake air F1 is typically filtered and would not be highly corrosive, however salt air and humid climate conditions could make the intake air more corrosive. Depending upon the application, the heat exchange medium F2 exterior to the heat exchanger, e.g., coolant, sea water or air with acidic moisture, may all increase the likelihood of corrosion. For all these reasons, the brazing sheet material should be corrosion resistant to withstand exposure to the applicable internal and external fluids, such as air and/or coolant without corroding for a commercially acceptable period of normal use. In addition, the heat exchanger HE should be strong and light in weight.

As noted above, the presence of Zn in amounts of 0.05 to 1.0 in the core 12 of the embodiment of FIG. 1 can be used to adjust the corrosion potential of the core 12 and the brazing sheet 10. For instance, the Zn addition may form Cu5Zn2Al and Cu3ZnAl3 phases (second phase particles), and/or other Al—Cu—Zn/Al—Cu—Mg—Zn phases, which alter the corrosion potential difference between the matrix (the remainder of the core 12) and second phase particles and reduce the potential for galvanic corrosion.

Figure 2:
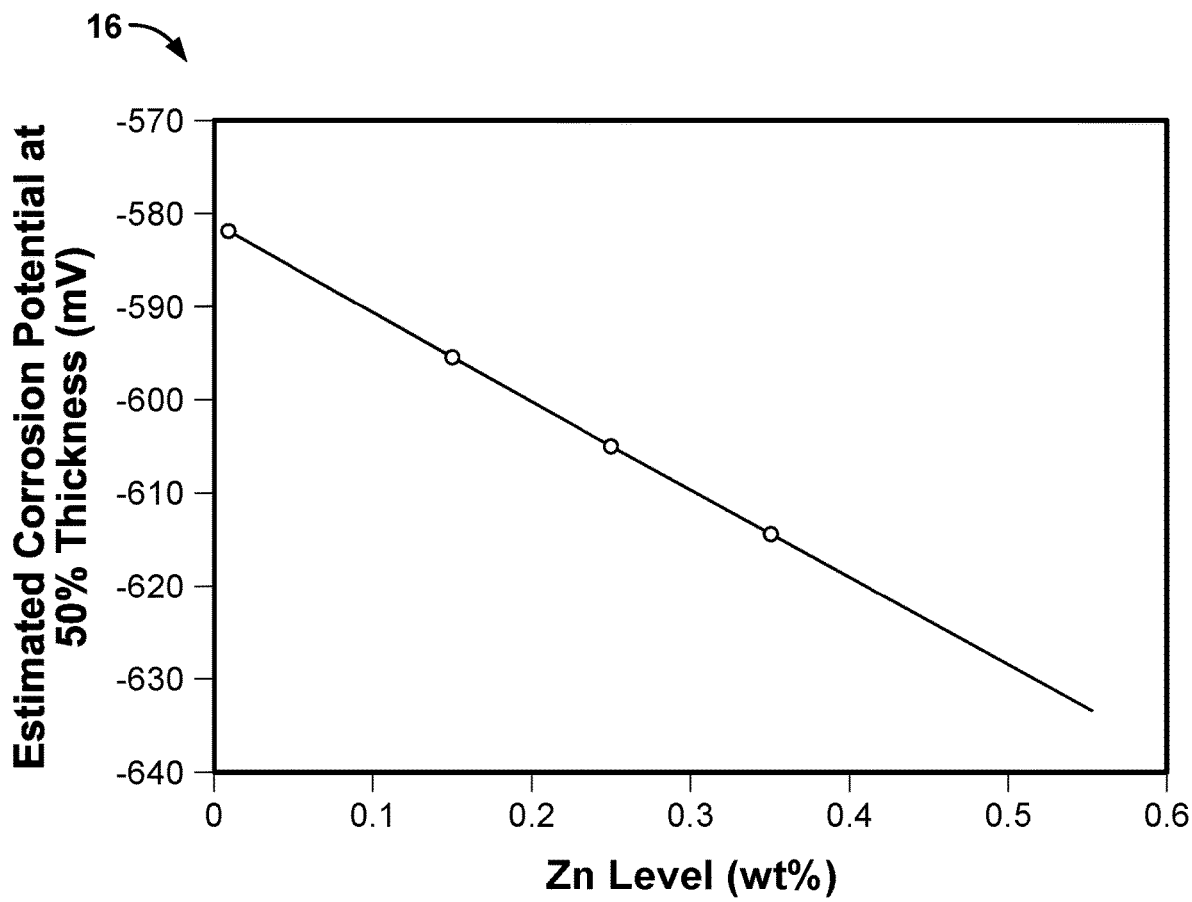
FIG. 2 is a graph of zinc level and corrosion potential in a core alloy sample with 2.5% copper proximate a medial position in the thickness dimension of the sample in accordance with an embodiment of the present disclosure.

FIG. 2 shows a graph 16 of estimated corrosion potential (Y-axis) at a medial position (at 50% of the thickness—in the center) of the core 12 depending upon Zn level in wt % (X-axis) for Zn additions to a 2.5 wt % Cu alloy. FIG. 2 shows that in accordance with the present disclosure, Zn may be added to a high Cu-containing core 12 to reduce corrosion potential.

In accordance with another embodiment of the 2-layer brazing sheet 10 of FIG. 1, the aluminum alloy core 12 has a composition of 0.1 to 1.0 wt % Si; up to 0.6 wt % Fe, 1.0 to 2.4 wt % Cu; 0.5 to 1.7 wt % Mn, up to 0.6 wt % Mg; 0.05 to 1.0 wt % Zn, up to 0.2 wt % Ti; up to 0.2 wt % Zr.

In accordance with another embodiment of the 2-layer brazing sheet 10 of FIG. 1, the aluminum alloy core 12 has a composition of 0.1 to 0.8 wt % Si; up to 0.6 wt % Fe, 1.2 to 2.3 wt % Cu; 0.5 to 1.5 wt % Mn, up to 0.4 wt % Mg; 0.05 to 0.8 wt % Zn, up to 0.18 wt % Ti; up to 0.18 wt % Zr.

Figure 3:
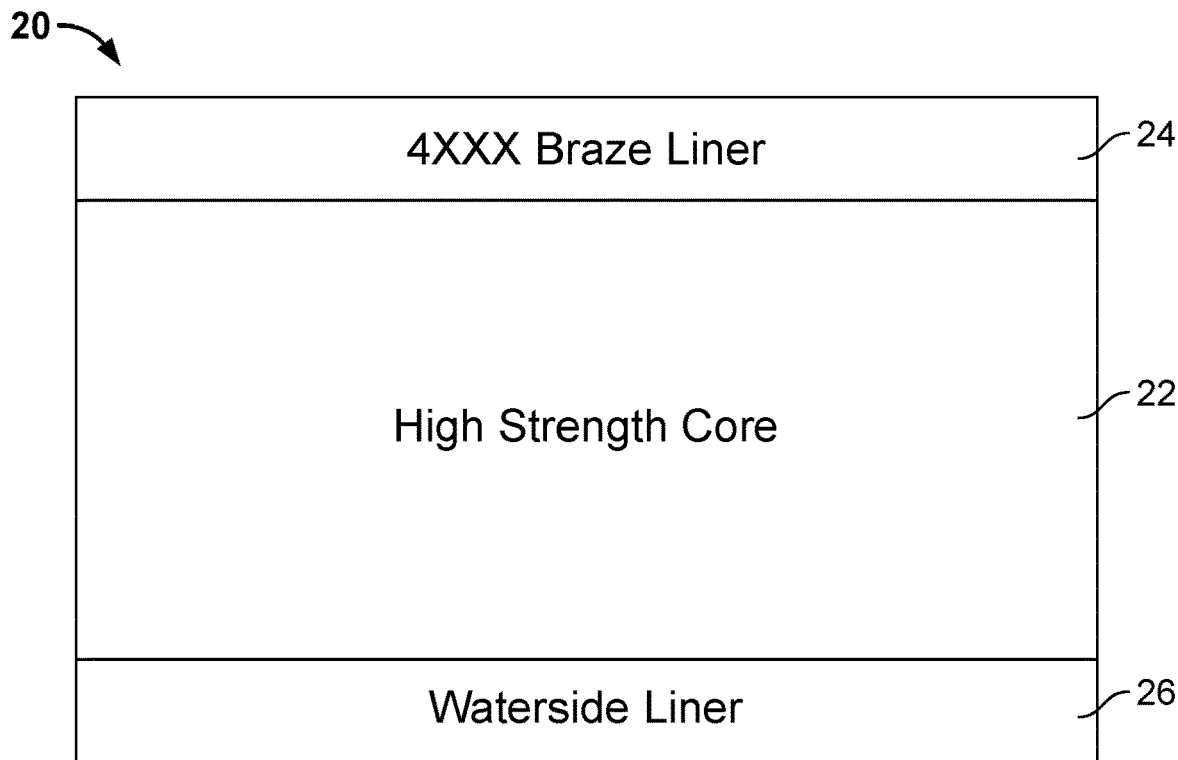
FIG. 3 is a diagrammatic view of a brazing sheet in accordance with another embodiment of the present disclosure.

FIG. 3 shows a brazing sheet material 20 in accordance with another embodiment of the present disclosure having a core 22, a braze liner 24 and a waterside liner 26. As in the embodiment shown in FIG. 1, the core 22 has significant Cu content and employs a Zn addition, which adjusts the corrosion potential within the core alloy and improves the corrosion life. As noted above, the Zn addition may form Cu5Zn2Al and Cu3ZnAl3 phases, and/or other Al—Cu—Zn/Al—Cu—Mg—Zn phases, which alter the corrosion potential difference between the matrix and second phase particles and reduce the potential for galvanic corrosion. The Cu and Zn content of the core 22 of the 3-layer brazing sheet 20 may be adjusted based upon the presence of the waterside liner 26, which, in an embodiment is a low Cu containing alloy having a composition of 0.1 to 1.2 wt % Si; up to 1.0 wt % Fe, up to 0.3 wt % Cu; up to 1.5 wt % Mn, up to 0.6 wt % Mg; 0.5 to 12 wt % Zn, up to 0.16 wt % Ti; up to 0.16 wt % Zr. In this embodiment of the 3-layer brazing sheet 26, the aluminum alloy core 22 has a composition of 0.05 to 0.8 wt % Si; up to 0.6 wt % Fe, 1.2 to 2.3 wt % Cu; 0.5 to 1.5 wt % Mn, up to 0.4 wt % Mg; 0.1 to 0.8 wt % Zn, up to 0.18 wt % Ti; up to 0.18 wt % Zr. The composition of the braze liner 24 (airside) would be: 6 to 13 wt % Si; up to 0.8 wt % Fe, up to 0.3 wt % Cu; up to 0.2 wt % Mn, up to 2.0 wt % Mg; up to 4.0 wt % Zn, up to 0.1 wt % Ti; up to 0.1 wt % Zr.

In accordance with another embodiment of the 3-layer brazing sheet 20 of FIG. 3, the waterside liner 26 is a low Cu containing alloy having a composition of 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; up to 0.16 wt % Zr, and the aluminum alloy core 22 has a composition of 0.1 to 0.8 wt % Si; up to 0.5 wt % Fe, 1.2 to 2.3 wt % Cu; 0.5 to 1.5 wt % Mn, up to 0.35 wt % Mg; 0.05 to 0.8 wt % Zn, up to 0.2 wt % Ti; up to 0.2 wt % Zr. The composition of the braze liner 24 would be the same as above.

In accordance with another embodiment of the 3-layer brazing sheet 20, of FIG. 3, the waterside liner 26 is a low Cu containing alloy having a composition of 0.1 to 1.2 wt % Si; up to 0.8 wt % Fe, up to 0.1 wt % Cu; up to 1.3 wt % Mn, up to 0.5 wt % Mg; 0.5 to 10 wt % Zn, up to 0.1 wt % Ti; up to 0.1 wt % Zr and the aluminum alloy core 22 has a composition of 0.1 to 0.8 wt % Si; up to 0.5 wt % Fe, 1.2 to 2.3 wt % Cu; 0.5 to 1.4 wt % Mn, up to 0.3 wt % Mg; 0.05 to 0.8 wt % Zn, up to 0.18 wt % Ti; up to 0.18 wt % Zr. The composition of the braze liner 24 would be the same as above.

In another embodiment of the 3-layer brazing sheet 20 of FIG. 3, the water side liner 26 is replaced with a 4XXX braze liner having a composition of 6 to 13 wt % Si; up to 0.8 wt % Fe, up to 0.3 wt % Cu; up to 0.2 wt % Mn, up to 2.0 wt % Mg; up to 4.0 wt % Zn and the aluminum alloy core 22 has a composition of 0.1 to 0.8 wt % Si; up to 0.5 wt % Fe, 1.2 to 2.3 wt % Cu; 0.5 to 1.4 wt % Mn, up to 0.3 wt % Mg; 0.05 to 0.8 wt % Zn, up to 0.18 wt % Ti; up to 0.18 wt % Zr.

Figure 4:
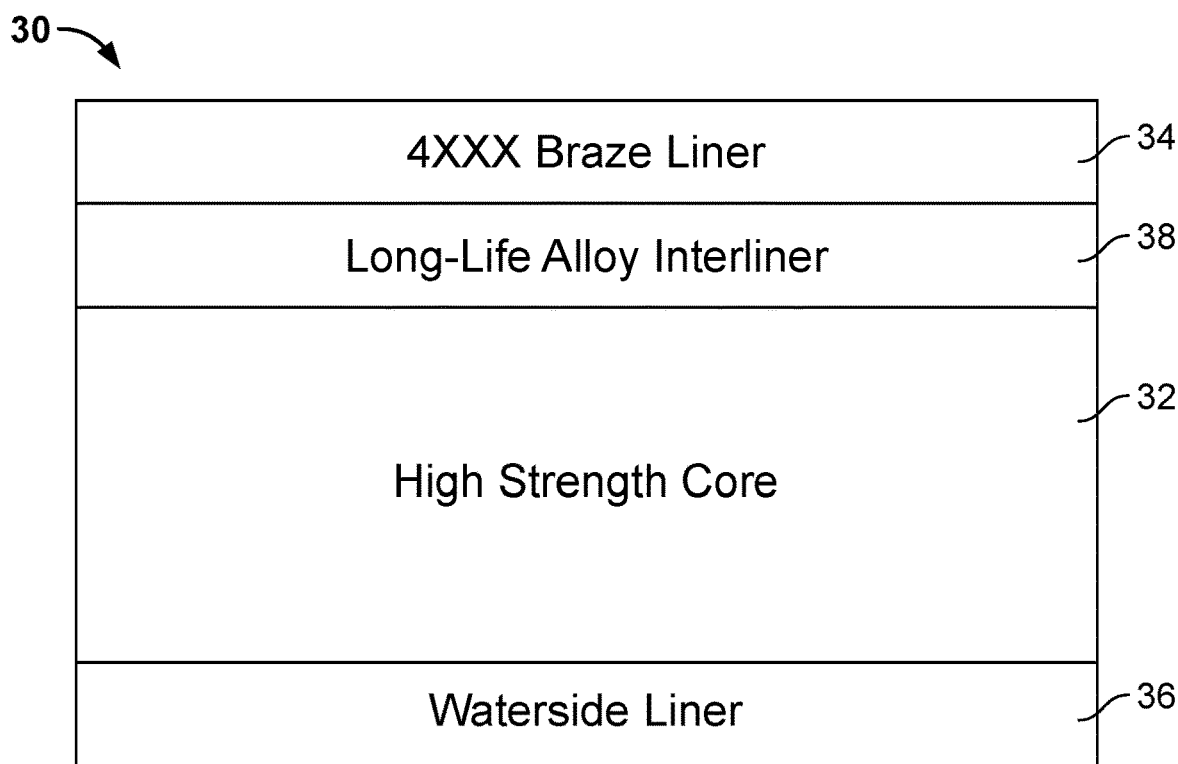
FIG. 4 is a cross-sectional view of a brazing sheet in accordance with an embodiment of the present disclosure.

FIG. 4 shows a brazing sheet material 30 in accordance with another embodiment of the present disclosure having a core 32, a braze liner 34, a waterside liner 36 and an interliner 38 positioned between the core 32 and the braze liner 34. The interliner 38 may be a "long-life aluminum alloy", including, but not limited to, alloys such as those identified in U.S. Pat. Nos. 4,649,087 and 4,828,794. Long-life aluminum alloys have been used for heat exchanger applications as core alloys. The alloy compositions are designed with high Mn and low Si. In the braze process, Si diffuses from the braze liner into the core, which pulls Mn out of the solution and forms a layer with dispersoid structure. The layer with dispersoid structure is anodic to the rest of the core due to a different Mn level in solution and it provides sacrificial corrosion protection to the core. Long life core alloys therefore have good corrosion life in a corrosive environment. In accordance with one embodiment of the present disclosure, the brazing sheet architecture is designed to take the advantage of the corrosion protection properties of the long-life alloy as an interliner 38 in combination with a high Cu containing core 32, with the interliner 38 providing corrosion protection to the Cu-containing alloy of the high strength core 32.

As in the embodiments shown in FIGS. 1 and 3, the core 32 employs a Zn addition, which adjusts the corrosion potential within the core alloy and improves the corrosion life. The Cu and Zn content of the core 32 of the 4-layer brazing sheet 30 may be adjusted based upon the presence of the waterside liner 36 and the interliner 38. In an embodiment of a 4-layer brazing sheet 30, the interliner 38 has a composition of up to 0.3 wt % Si; up to 0.5 wt % Fe, 0.1 to 1.0 wt % Cu; 0.5 to 1.8 wt % Mn, up to 0.3 wt % Mg; up to 0.25 wt % Zn, up to 0.25 wt % Ti; up to 0.25 wt % Zr, etc. The waterside liner 36 is a low Cu containing alloy having a composition of 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; up to 0.16 wt % Zr, etc. The aluminum alloy core 32 has a composition of 0.1 to 1.0 wt % Si; up to 0.6 wt % Fe, 1.0 to 2.5 wt % Cu; 0.5 to 1.8 wt % Mn, up to 0.6 wt % Mg; 0.05 to 1.0 wt % Zn, up to 0.2 wt % Ti; up to 0.2 wt % Zr. The composition of the braze liner 34 (airside) would be: 6 to 13 wt % Si; up to 0.8 wt % Fe, up to 0.3 wt % Cu; up to 0.2 wt % Mn, up to 2 wt % Mg; up to 4 wt % Zn, up to 0.1 wt % Ti; up to 0.1 wt % Zr.

In another embodiment of a 4-layer brazing sheet 30, the interliner 38 has a composition of up to 0.2 wt % Si; up to 0.5 wt % Fe, 0.3 to 0.9 wt % Cu; 0.5 to 1.8 wt % Mn, up to 0.35 wt % Mg; up to 0.2 wt % Zn, up to 0.18 wt % Ti; up to 0.18 wt % Zr. The waterside liner 36 is a low Cu containing alloy having a composition of 0.1 to 1.0 wt % Si; up to 1.0 wt % Fe, up to 0.2 wt % Cu; up to 1.2 wt % Mn, up to 0.5 wt % Mg; 0.5 to 10 wt % Zn, up to 0.1 wt % Ti; up to 0.1 wt % Zr, etc. The aluminum alloy core 32 has a composition of 0.1 to 0.8 wt % Si; up to 0.5 wt % Fe, 1.0 to 2.5 wt % Cu; 0.5 to 1.6 wt % Mn, up to 0.3 wt % Mg; 0.05 to 0.8 wt % Zn, up to 0.18 wt % Ti; up to 0.18 wt % Zr. The composition of the braze liner 34 (airside) would be: 6 to 13 wt % Si; up to 0.8 wt % Fe, up to 0.3 wt % Cu; up to 0.2 wt % Mn, up to 2 wt % Mg; up to 4 wt % Zn, up to 0.1 wt % Ti; up to 0.1 wt % Zr.

In another embodiment of a 4-layer brazing sheet 30, the interliner 38 has a composition of up to 0.15 wt % Si; up to 0.4 wt % Fe, 0.2 to 0.9 wt % Cu; 0.5 to 1.7 wt % Mn, up to 0.3 wt % Mg; up to 0.15 wt % Zn, up to 0.16 wt % Ti; up to 0.16 wt % Zr. The waterside liner 36 is a low Cu containing alloy having a composition of 0.1 to 1.0 wt % Si; up to 0.9 wt % Fe, up to 0.2 wt % Cu; up to 1.4 wt % Mn, up to 0.5 wt % Mg; 0.5 to 8 wt % Zn, up to 0.1 wt % Ti; up to 0.1 wt % Zr. The aluminum alloy core 32 has a composition of 0.1 to 0.8 wt % Si; up to 0.5 wt % Fe, 1.0 to 2.3 wt % Cu; 0.5 to 1.5 wt % Mn, up to 0.3 wt % Mg; 0.05 to 0.8 wt % Zn, up to 0.18 wt % Ti; up to 0.18 wt % Zr. The composition of the braze liner 34 (airside) would be: 6 to 13 wt % Si; up to 0.8 wt % Fe, up to 0.3 wt % Cu; up to 0.2 wt % Mn, up to 1.8 wt % Mg; up to 3.5 wt % Zn, up to 0.1 wt % Ti; up to 0.1 wt % Zr.

Figure 5:
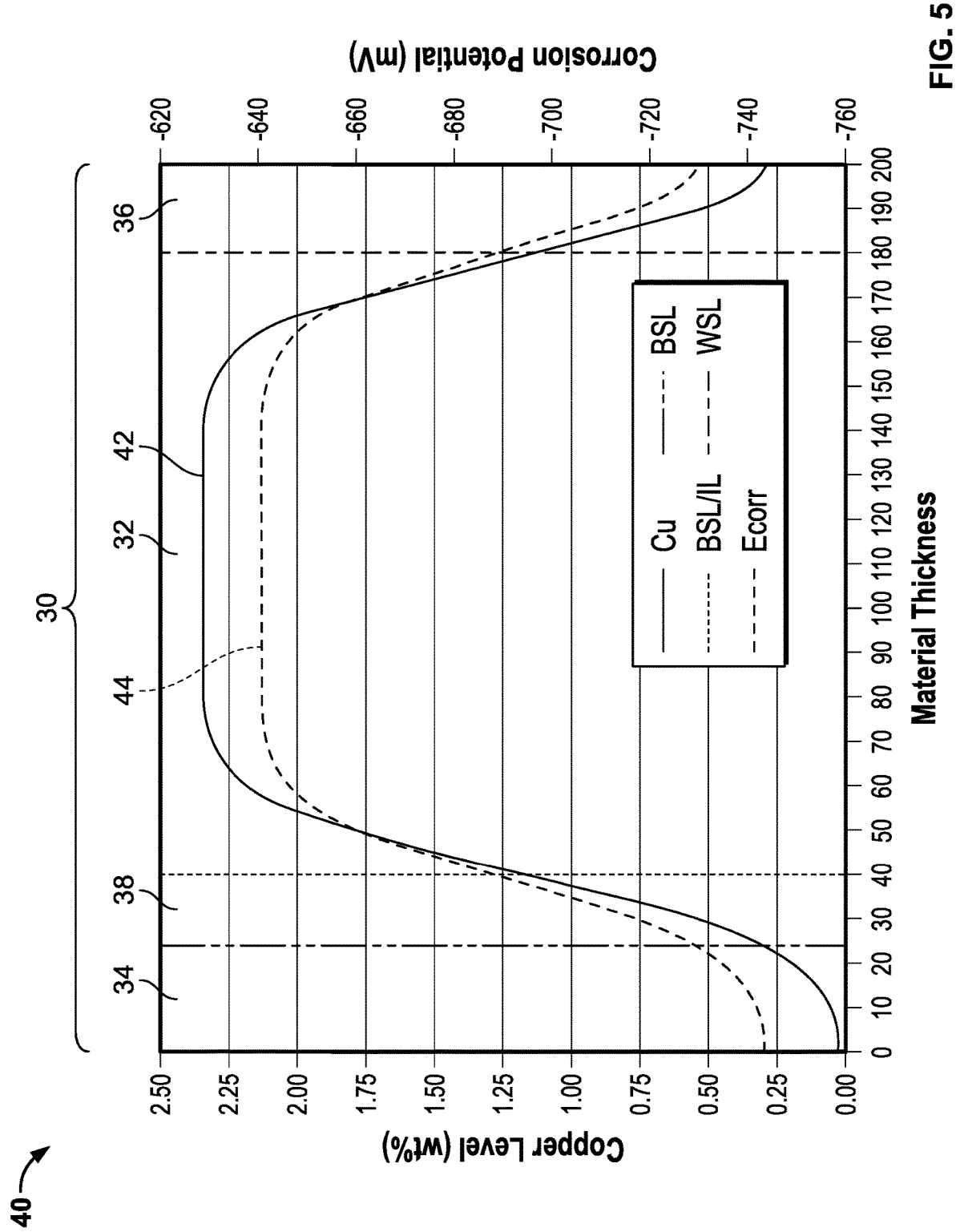
FIG. 5 is a graph of copper level and corrosion potential through the thickness of a brazing sheet like that shown in FIG. 4.

As in the brazing sheet 20 of FIG. 3, the waterside liner 36 can be replaced with a 4XXX braze liner, as described above. In this case, the composition of the core 32 and interliner 38 would be adjusted as follows:

FIG. 5 is a graph 40 of the level 42 of copper in weight % (left Y-axis) within a brazing sheet 30 like brazing sheet 30 of FIG. 4 at various depths in the brazing sheet 30 (x-axis) The measurement starts at the surface of the braze liner 34 (which is 0-24 microns in depth/thickness), is taken through the interlayer 38 (24-40 microns), through the core 32 (40-180 microns) and through the water side liner 36 (180-200 microns). As shown, the copper level is at a minimum in the braze liner 34 (0.04-0.25 wt %), ascends through the interliner 38 (from 0.25 to 1.25 wt %), peaks in the center of the core 32 (at 2.40 wt %) and then descends to 0.30 wt % at the surface of the water side liner 36. The corrosion potential (right Y axis) roughly parallels the presence of Cu in the brazing sheet as shown in FIG. 2. More particularly, the corrosion potential is at a minimum (about −744 mV) starting at the surface of the braze liner 34, ramps up from −730 mV to −690 mV through the interlayer 38, from −690 mV it peaks at −644 mV at the center of the core 32 and descends through the water side liner 36 from −690 mV to −730 mV at the surface of the water side liner 36.

As shown in FIG. 5, in one embodiment of the present disclosure, an approach to improve the corrosion property of the brazing sheet 30 is to use an interliner 38 with low Cu, which establishes a Cu gradient from the exterior surface of the braze liner 34 on one side and the waterside liner 36 on the other side of the core 32 of the brazing sheet 30. This gives rise to a corrosion potential difference through the thickness of the brazing sheet 30 attributable to the Cu level difference, in which the low Cu levels on either side of the core 32 provide corrosion protection to the core 32.

Figure 8:
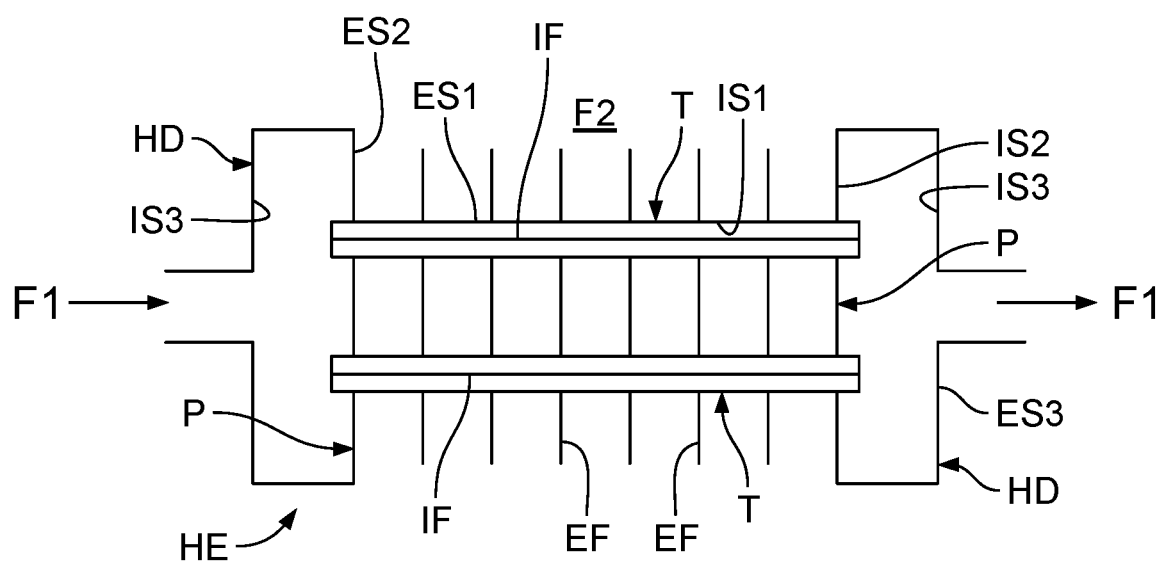
FIG. 8 is a diagrammatic depiction of a heat exchanger.

An aspect of the present disclosure is the recognition that high Cu levels in the core, e.g., 12, 22, 32 may result in a large differences in corrosion potential between the heat exchanger components, such as a tube made from the brazing material 10, 20, 30 and fins used to facilitate heat transfer. For example, FIG. 8 diagrammatically shows a heat exchanger HE having fins EF external to tubes T as well as fins IF internal to the tubes T. The internal fins IF aid in transferring heat between the fluid F1, e.g., compressed air, flowing through the tubes T between the headers HD, and the tubes T. The external fins EF aid in transferring heat between the tubes T and an external fluid F2, e.g., the atmosphere or liquid coolant. Contact between the internal fins IF and the external fins EF with the tubes T promotes heat transfer and also mechanically supports the tubes T structurally. The corrosion of the internal fins IF and/or the external fins EF would therefore have a negative impact on the heat exchange efficiency of the heat exchanger HE, as well as diminishing its structural strength and integrity. Normally, fin alloy, such as commonly used 3003+Zn/3003mod with a Zn addition have a composition including about 0.5 wt % Zn or higher that is anodic to the tube to provide sacrificial corrosion protection to the tube (core). However if the corrosion potential of the core alloy of the brazing sheet used to make the tubes is significantly cathodic and the difference in corrosion potential between tube and fin is significantly large, the fin can be damaged due to premature corrosion. This may reduce the mechanical support provided by the fins to the tubes, degrading the mechanical integrity of the heat exchanger assembly and present a high risk of tube corrosion due to a lack of fin protection. In accordance with the present disclosure, Zn added to the core is used to lower the corrosion potential of the brazing sheet 40 used to form structures, like tubes, such that the heat exchanger component that provides the sacrificial corrosion protection, e.g., fins, are not severely corroded and the integrity of the resultant heat exchanger is preserved.

Mechanical and Thermal Practices Used in Preparing the Brazing Sheet

The fabrication practice includes, but is not limited to, casting the ingot of the high strength core alloy and the 4xxx braze liner alloy, and for those embodiments that utilize them, casting the 3xxx interliner alloy for the 4-layer architecture, and/or the 7xxx/3xxx+Zn water side liner alloy. In some embodiments, the ingots are subjected to a preheat or homogenization in temperature range of 400° C.-560° C. for a soak time of up to 6 hours before rolling into a liner or interliner. The high strength core ingot may also be subjected to a similar thermal treatment. In some embodiments, the ingots are not subjected to a thermal treatment before rolling. In some embodiments, the high strength core ingot is not subjected to a thermal treatment before hot rolling.

In some embodiments, the composite consists of either 3 or 4 layers that are subjected to a reheat process for hot rolling. The hot rolling temperature has a range of 400° C.-520° C.

In some embodiments, the composite is cold rolled to an intermediate gauge and then goes through an intermediate anneal at a temperature range of 340° C.-420° C. and soak time up to 8 hours. The composite after intermediate anneal is again cold rolled to a lighter gauge or a final gauge. In some embodiments, the material may be subjected to more than one intermediate anneal and then rolled to a lighter gauge and then another intermediate anneal. In some embodiments, the material at the final gauge is subject to a final partial anneal or a full anneal in a temperature range of 150° C.-420° C. and a soak time up to 8 hours.

In some embodiments, the composite is cold rolled directly to a final gauge without an intermediate anneal and then subjected to a final partial anneal or a full anneal in a temperature range of 150° C.-420° C. and soak time up to 8 hours.

Experimental Results

Various examples of cores, interliners and waterside liners having various compositions were prepared. The compositions of the high strength core alloys with significant Cu content are shown in Table 1, the long-life alloy compositions for the interliner are shown in Table 2, and the waterside liner compositions are in Table 3.

TABLE 1

Experimental Chemical Compositions of High Strength Core Alloys.

| Alloy | Cast # | Si | Fe | Cu | Mn | Mg | Zn | Ti |
|---|---|---|---|---|---|---|---|---|
| Core 1 | 990845 | 0.52 | 0.20 | 1.53 | 1.52 | 0.25 | 0.002 | 0.15 |
| Core 2 | 990846 | 0.54 | 0.21 | 1.87 | 1.53 | 0.25 | 0.003 | 0.14 |
| Core 3 | 990847 | 0.50 | 0.20 | 1.55 | 1.44 | 0.002 | 0.002 | 0.15 |
| Core 4 | 990848 | 0.51 | 0.20 | 1.82 | 1.49 | 0.003 | 0.002 | 0.15 |
| Core 5 | 990880 | 0.10 | 0.20 | 2.20 | 1.23 | 0.24 | 0.001 | 0.15 |
| Core 6 | 990881 | 0.10 | 0.20 | 2.51 | 1.21 | 0.24 | 0.001 | 0.15 |
| Core 7 | 991033-B2-1 | 0.1 | 0.23 | 2.36 | 1.19 | 0.24 | 0.001 | 0.13 |
| Core 8 | 991033-C2-1 | 0.11 | 0.27 | 2.39 | 1.22 | 0.23 | 0.26 | 0.16 |
| Core 9 | 991033-D3-1 | 0.1 | 0.24 | 2.39 | 1.19 | 0.0003 | 0.25 | 0.15 |
| Core 10 | B8940 | 0.25 | 0.22 | 1.83 | 1.10 | 0.037 | 0.01 | 0.15 |

TABLE 2

Chemical Compositions of Interliner Alloys.

| Alloy | Cast # | Si | Fe | Cu | Mn | Mg | Zn | Ti | Zr |
|---|---|---|---|---|---|---|---|---|---|
| IL1 | B17-0037 | 0.07 | 0.16 | 0.49 | 1.08 | 0.22 | 0.01 | 0.160 | — |
| IL2 | B17-0036 | 0.03 | 0.12 | 0.540 | 1.65 | 0.14 | 0.01 | 0.010 | — |
| IL3 | B17-0003 | 0.07 | 0.19 | 0.29 | 0.97 | 0.01 | 0.01 | 0.140 | 0.08 |

TABLE 3

Chemical Compositions of Waterside Liner Alloys.

| Alloy | Cast # | Si | Fe | Cu | Mn | Mg | Zn | Ti |
|---|---|---|---|---|---|---|---|---|
| WSL1 | 990849 | 0.18 | 0.17 | 0.002 | 0.17 | 0.002 | 8.39 | 0.008 |
| WSL2 | 990882 | 0.48 | 0.21 | 0.002 | 0.90 | 0.002 | 6.61 | 0.006 |
| WSL3 | 991033-G6 | 0.46 | 0.23 | 0.001 | 0.2 | 0.000 | 5.7 | 0.006 |
| WSL4 | B8888 | 0.406 | 0.405 | 0.001 | 0.172 | 0.000 | 4.89 | 0.002 |

Table 4 lists the pre-braze tensile properties of the experimental samples prepared from the listed cores, interliners and water side liners of Tables 1-3. In all instances, a 4000 series braze liner 24, 34 was used.

TABLE 4

Pre Braze Tensile Properties

| Sample | Core | I/L | WSL | Pre Braze UTS (MPa) | TYS (MPa) | Elong (%) |
|---|---|---|---|---|---|---|
| A | Core 1 | IL3 | WSL1 | 224.4 | 190.8 | 9.3 |
| B | Core 2 | IL3 | WSL1 | 223.2 | 190.8 | 9.2 |
| C | Core 3 | IL3 | WSL1 | 204.1 | 184.1 | 9.8 |
| D | Core 4 | IL3 | WSL1 | 202.8 | 188.5 | 9 |
| E | Core 5 | IL2 | WSL2 | 229.9 | 194.9 | 11.6 |
| F | Core 6 | IL2 | WSL2 | 233.3 | 199.7 | 11.3 |
| G | Core 5 | IL1 | WSL2 | 228.7 | 194.3 | 11 |
| H | Core 6 | IL1 | WSL2 | 226.0 | 193.2 | 9.7 |
| I | Core 4 | No | WSL2 | 216.1 | 198.1 | 10 |
| J | Core 7 | IL2 | WSL3 | 205.7 | 176.1 | 15.1 |
| K | Core 8 | No | WSL3 | 204.6 | 176.3 | 12.6 |
| L | Core 9 | No | WSL3 | 204.1 | 178.2 | 10.9 |
| M | Core 10 | IL3 | WSL4 | 207.2 | 181.1 | 11.9 |

Table 5 lists the post-braze tensile properties of the experimental samples of Table 4.

TABLE 5

Post Braze Tensile Properties

| Sample | Core | I/L | WSL | Post Braze + Natural Age | | | Post Braze + Age @ 90 C | | |
|---|---|---|---|---|---|---|---|---|---|
| | | | | UTS (MPa) | TYS (MPa) | Elong (%) | UTS (MPa) | TYS (MPa) | Elong (%) |
| A | Core 1 | IL3 | WSL1 | 232 | 101.8 | 11.5 | 251.5 | 115.6 | 12.3 |
| B | Core 2 | IL3 | WSL1 | 248.7 | 111.2 | 12.6 | 266.2 | 123 | 12.4 |
| C | Core 3 | IL3 | WSL1 | 165.5 | 72.5 | 8.1 | 182.8 | 68.7 | 10.8 |
| D | Core 4 | IL3 | WSL1 | 171.5 | 64.9 | 8.7 | 191.5 | 73 | 11.6 |
| E | Core 5 | IL2 | WSL2 | 258.4 | 126.6 | 10 | 264.5 | 125.1 | 9.8 |
| F | Core 6 | IL2 | WSL2 | 275.2 | 138.2 | 11.1 | 283 | 139.6 | 10.8 |
| G | Core 5 | IL1 | WSL2 | 270.6 | 130.2 | 11.7 | 265.1 | 127 | 11.3 |
| H | Core 6 | IL1 | WSL2 | 263.4 | 134.2 | 10 | 267.6 | 132.6 | 10 |
| I | Core 4 | No | WSL2 | 181.1 | 66.7 | 10.1 | 188.5 | 68.4 | 11.6 |
| J | Core 7 | IL2 | WSL3 | 266.4 | 125.3 | 18.3 | 268.2 | 121.8 | 19.3 |
| K | Core 8 | — | WSL3 | 259.5 | 113.5 | 14.5 | 266.7 | 124.2 | 15.0 |
| L | Core 9 | — | WSL3 | 191.0 | 65.4 | 20.0 | 195.8 | 68.1 | 21.6 |
| M | Core 10 | IL3 | WSL3 | 176.9 | 65.4 | 15.4 | 188.7 | 69.9 | 12.4 |

Table 6 lists post-braze tensile properties for two samples extracted from Table 5, i.e., Samples D and L. The Zn addition in Core 9 reduced the softening of the post braze sample and therefore improved the post braze strength. Sample D showed a low UTS for the post braze+natural age condition, while sample L did not show the UTS drop with the same fabrication process and under the same post braze condition. The difference is the core 4 alloy for sample D did not have Zn but the core alloy 9 had Zn.

TABLE 6

Comparison of Post Braze Tensile Properties

| Sample | Post Braze | | | Post Braze + Natural Age | | | Post Braze + Age @ 90 C | | |
|---|---|---|---|---|---|---|---|---|---|
| | UTS (MPa) | TYS (MPa) | Elong (%) | UTS (MPa) | TYS (MPa) | Elong (%) | UTS (MPa) | TYS (MPa) | Elong (%) |
| D | 194.9 | 71.7 | 11.8 | 171.5 | 64.9 | 8.7 | 191.5 | 73 | 11.6 |
| L | 193.3 | 68.1 | 19.1 | 191.0 | 65.4 | 20.0 | 195.8 | 68.1 | 21.6 |

All of the samples of Tables 4 and 5 showed resistance to external corrosion. The interliners provided good corrosion protection to the high strength core alloys such that the samples passed SWAAT for 40 days with no deep corrosion pit.

Figure 6:
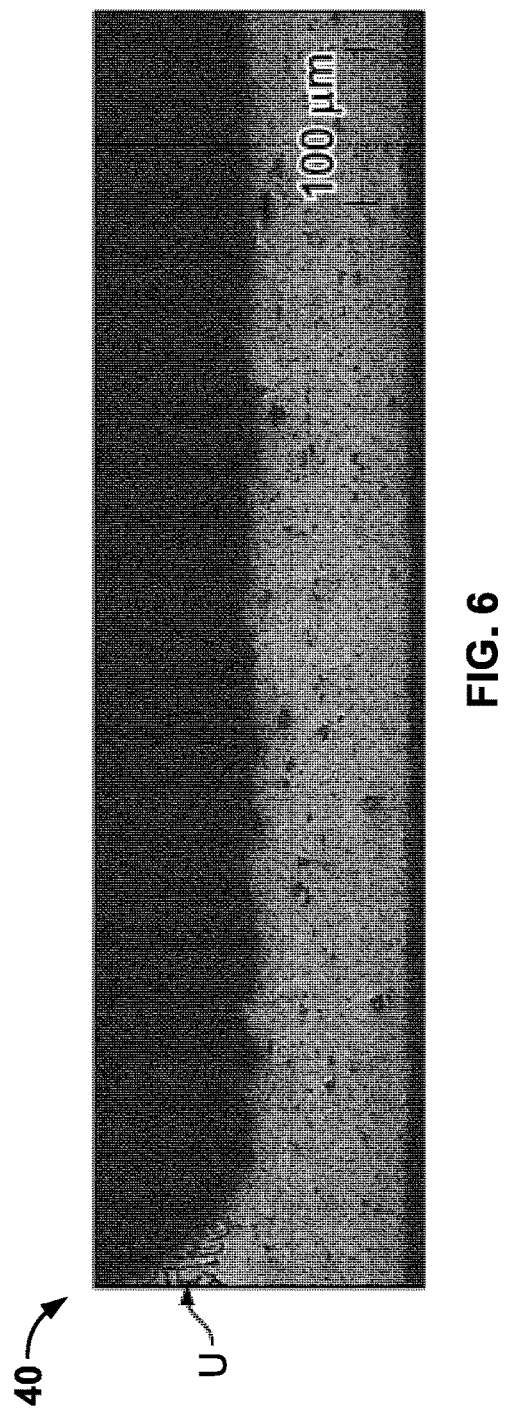
FIG. 6 is a cross-sectional view of a brazing sheet in accordance with another embodiment of the present disclosure.

FIG. 6 shows a brazing sheet 40 having the composition described in Tables 4 and 5 as Sample H of a four-layer brazing sheet 30 like that shown in FIG. 4, at 0.13 mm gauge and after a SWAAT corrosion test applied to the braze liner 34/external surface (See FIG. 4) side for 40 days. In this respect, FIG. 6 illustrates an external corrosion test, which would be pertinent, e.g., to the external surfaces ES1, ES2, ES3 of a heat exchanger HE (See FIG. 8). In FIG. 6, the upper surface U is the external surface.

Figure 7:
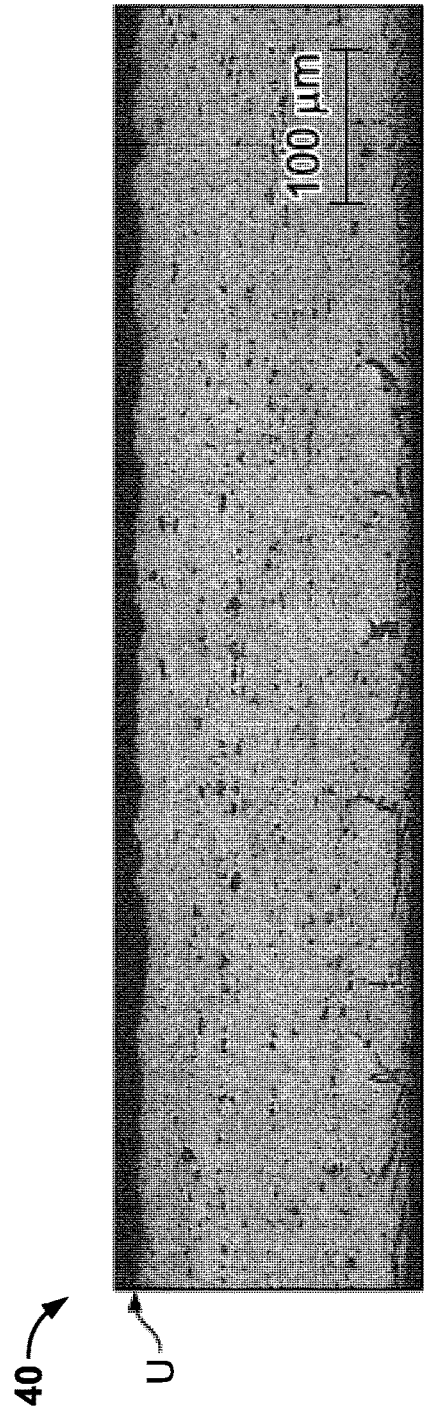
FIG. 7 is a cross-sectional view of a brazing sheet in accordance with an embodiment of the present disclosure.

The samples also showed good resistance to internal corrosion. The waterside liners provided good corrosion protection to the high strength core on the coolant side. FIG. 7 shows a brazing sheet 40 having the composition described in Tables 4 and 5 as Sample H at 0.2 mm gauge after an internal corrosion (OY) test for 4 months. In this test, the waterside liner 36 side was exposed to corrosion solution. In FIG. 7, the upper surface U is the waterside liner 36 side.

The present disclosure utilizes standard abbreviations for the elements that appear in the periodic table of elements, e.g., Mg (magnesium), O (oxygen), Si (silicon), Al (aluminum), Bi (bismuth), Fe (iron), Zn (zinc), Cu (copper), Mn (manganese), Ti (titanium), Zr (zirconium), F (fluorine), K (potassium), Cs (Cesium), etc.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Aspects of the invention will now be described with reference to the following numbered clauses:

1. A sheet material, comprising:
an aluminum alloy core, comprising 0.1 to 1.2 wt % Si; up to 0.6 wt % Fe, 1.0 to 2.6 wt % Cu; 0.5 to 1.8 wt % Mn, up to 0.6 wt % Mg; 0.05 to 1.0 wt % Zn, up to 0.2 wt % Ti; up to 0.2 wt % Zr; a 4XXX aluminum alloy braze liner, comprising 6 to 13 wt % Si; up to 0.8 wt % Fe, up to 0.3 wt % Cu; up to 0.2 wt % Mn; up to 2.0 wt % Mg; up to 4.0 wt % Zn.

2. The sheet material of clause 1, wherein the Zn of the core forms second phase particles which alter the corrosion potential difference between the matrix of the core and the second phase particles.

3. The sheet material of clause 1 or 2, wherein the Zn of the core forms at least one of Cu5Zn2Al, Cu3ZnAl3 or another of Al—Cu—Zn/Al—Cu—Mg—Zn phases.

4. The sheet material of any of clauses 1 to 3, wherein the core comprises 0.1 to 1.0 wt % Si; up to 0.6 wt % Fe, 1.0 to 2.4 wt % Cu; 0.5 to 1.7 wt % Mn, up to 0.6 wt % Mg; 0.05 to 1.0 wt % Zn, up to 0.2 wt % Ti; and up to 0.2 wt % Zr 5. The sheet material of any of clauses 1 to 4, wherein the core comprises 0.1 to 0.8 wt % Si; up to 0.6 wt % Fe, 1.2 to 2.3 wt % Cu; 0.5 to 1.5 wt % Mn, up to 0.4 wt % Mg; 0.05 to 0.8 wt % Zn, up to 0.18 wt % Ti; and up to 0.18 wt % Zr.

6. The sheet material of any of clauses 1 to 5, further comprising a waterside liner, comprising 0.1 to 1.2 wt % Si; up to 1.0 wt % Fe, up to 0.3 wt % Cu; up to 1.5 wt % Mn, up to 0.6 wt % Mg; 0.5 to 12 wt % Zn, up to 0.16 wt % Ti; and up to 0.16 wt % Zr; and wherein the core comprises 0.05 to 0.8 wt % Si; up to 0.6 wt % Fe, 1.2 to 2.3 wt % Cu; 0.5 to 1.5 wt % Mn, up to 0.4 wt % Mg; 0.1 to 0.8 wt % Zn, up to 0.18 wt % Ti; and up to 0.18 wt % Zr.

7. The sheet material of any of clauses 1 to 6, further comprising a waterside liner, comprising 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; and up to 0.16 wt % Zr; and wherein the core comprises 0.1 to 0.8 wt % Si; up to 0.5 wt % Fe, 1.2 to 2.3 wt % Cu; 0.5 to 1.5 wt % Mn, up to 0.35 wt % Mg; 0.05 to 0.8 wt % Zn, up to 0.2 wt % Ti; and up to 0.2 wt % Zr.

8. The sheet material of any of clauses 1 to 7, further comprising a waterside liner, comprising 0.1 to 1.2 wt % Si; up to 0.8 wt % Fe, up to 0.1 wt % Cu; up to 1.3 wt % Mn, up to 0.5 wt % Mg; 0.5 to 10 wt % Zn, up to 0.1 wt % Ti; and up to 0.1 wt % Zr; and wherein the core comprises 0.1 to 0.8 wt % Si; up to 0.5 wt % Fe, 1.2 to 2.3 wt % Cu; 0.5 to 1.4 wt % Mn, up to 0.3 wt % Mg; 0.05 to 0.8 wt % Zn, up to 0.18 wt % Ti; and up to 0.18 wt % Zr.

9. The sheet material of any of clauses 1 to 8, wherein the 4XXX aluminum alloy braze liner is a first 4XXX braze liner and further comprising a second 4XXX braze liner disposed on the core distal to the first 4XXX braze liner, the second 4XXX braze liner comprising 6 to 13 wt % Si; up to 0.8 wt % Fe, up to 0.3 wt % Cu; up to 0.2 wt % Mn, up to 2.0 wt % Mg; up to 4.0 wt % Zn and wherein the core comprises 0.1 to 0.8 wt % Si; up to 0.5 wt % Fe, 1.2 to 2.3 wt % Cu; 0.5 to 1.4 wt % Mn, up to 0.3 wt % Mg; 0.05 to 0.8 wt % Zn, up to 0.18 wt % Ti; and up to 0.18 wt % Zr.

10. The sheet material of any of clauses 1 to 9, further comprising a waterside liner and an interliner positioned between the core and the braze liner.

11. The sheet material of any of clauses 1 to 10, wherein the interliner comprises up to 0.3 wt % Si; up to 0.5 wt % Fe, 0.1 to 1.0 wt % Cu; 0.5 to 1.8 wt % Mn, up to 0.3 wt % Mg; up to 0.25 wt % Zn, up to 0.25 wt % Ti; and up to 0.25 wt % Zr, wherein the waterside liner comprises 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; and up to 0.16 wt % Zr, and wherein the core comprises 0.1 to 1.0 wt % Si; up to 1.0 wt % Fe, 1.0 to 2.5 wt % Cu; 0.5 to 1.8 wt % Mn, up to 0.6 wt % Mg; 0.05 to 1.0 wt % Zn, up to 0.2 wt % Ti; and up to 0.2 wt % Zr.

12. The sheet material of any of clauses 1 to 10, wherein the interliner comprises up to 0.2 wt % Si; up to 0.5 wt % Fe, 0.3 to 0.9 wt % Cu; 0.5 to 1.8 wt % Mn, up to 0.35 wt % Mg; up to 0.2 wt % Zn, up to 0.18 wt % Ti; and up to 0.18 wt % Zr, wherein the waterside liner comprises 0.1 to 1.0 wt % Si; up to 1.0 wt % Fe, up to 0.2 wt % Cu; up to 1.2 wt % Mn, up to 0.5 wt % Mg; 0.5 to 10 wt % Zn, up to 0.1 wt % Ti; and up to 0.1 wt % Zr, and wherein the core comprises 0.1 to 0.8 wt % Si; up to 0.5 wt % Fe, 0.5 to 2.5 wt % Cu; 1.0 to 1.6 wt % Mn, up to 0.3 wt % Mg; 0.05 to 0.8 wt % Zn, up to 0.18 wt % Ti; and up to 0.18 wt % Zr.

13. The sheet material of any of clauses 1 to 10, wherein the interliner comprises up to 0.15 wt % Si; up to 0.4 wt % Fe, 0.2 to 0.9 wt % Cu; 0.5 to 1.7 wt % Mn, up to 0.3 wt % Mg; up to 0.15 wt % Zn, up to 0.16 wt % Ti; and 0.1 to 0.16 wt % Zr, wherein the waterside liner comprises 0.1 to 1.0 wt % Si; up to 0.9 wt % Fe, up to 0.2 wt % Cu; up to 1.4 wt % Mn, up to 0.5 wt % Mg; 0.5 to 8 wt % Zn, up to 0.1 wt % Ti; and up to 0.1 wt % Zr, and wherein the core comprises 0.1 to 0.8 wt % Si; up to 0.5 wt % Fe, 1.0 to 2.3 wt % Cu; 0.5 to 1.5 wt % Mn, up to 0.3 wt % Mg; 0.05 to 0.8 wt % Zn, up to 0.18 wt % Ti; and up to 0.18 wt % Zr.

14. A heat exchanger, comprising at least one tube capable of conducting a fluid therethrough and at least one fin in heat conductive contact with the tube, the tube having a core comprising 0.1 to 1.2 wt % Si; up to 0.6 wt % Fe, 1.0 to 2.6 wt % Cu; 0.5 to 1.8 wt % Mn, up to 0.6 wt % Mg; 0.05 to 1.0 wt % Zn, up to 0.2 wt % Ti; and up to 0.2 wt % Zr; or, in the alternative a core made in accordance with any of clauses 1 to 13; and a 4XXX aluminum alloy braze liner, comprising 6 to 13 wt % Si; up to 0.8 wt % Fe, up to 0.3 wt % Cu; up to 0.2 wt % Mn, up to 2.0 wt % Mg; up to 4.0 wt % Zn, the fin comprising an aluminum alloy with a Zn addition, the Zn of the core reducing the corrosion potential difference between the tube and the fin.

15. The heat exchanger of clause 14, wherein the fin alloy is 3003+Zn/3003mod and the Zn addition ≥0.5 wt %.

16. A method for making a sheet material having an interliner comprising up to 0.3 wt % Si; up to 0.5 wt % Fe, 0.1 to 1.0 wt % Cu; 0.5 to 1.8 wt % Mn, up to 0.3 wt % Mg; up to 0.25 wt % Zn, up to 0.25 wt % Ti; and up to 0.25 wt % Zr, a waterside liner comprising 0.1 to 1.2 wt % Si; up to 1.0 wt % Fe, up to 0.2 wt % Cu; up to 1.5 wt % Mn, up to 0.6 wt % Mg; 0.5 to 12 wt % Zn, up to 0.16 wt % Ti; and up to 0.16 wt % Zr, a core comprising 0.1 to 1.0 wt % Si; up to 1.0 wt % Fe, 1.0 to 2.5 wt % Cu; 0.5 to 1.8 wt % Mn, up to 0.6 wt % Mg; 0.05 to 1.0 wt % Zn, up to 0.2 wt % Ti; and up to 0.2 wt % Zr, and a 4XXX braze liner, or alternatively a core, interliner and or braze liner in accordance with any of clauses 1-15, comprising the steps of:

casting the ingots for the interliner, the waterside liner, the core and the braze liner; subjecting the ingots for the interliner, the waterside liner, the core and the braze liner to a preheat in a temperature range of 400-560° C. for a soak time of up to 6 hours; rolling the ingots for the interliner, the waterside liner, the core and the braze liner to form stackable laminae; stacking the laminae into a composite; rolling the composite to form the sheet material.

17. The method of clause 16, wherein the step of rolling of the composite is conducted at a temperature of 400-520° C.

18. The method of clause 16, wherein the step of rolling the composite is conducted at room temperature.

19. The method of clause 16, wherein the step of rolling the composite is conducted by cold rolling to an intermediate gauge followed by an intermediate anneal at a temperature in the range of 340-420° C., followed by cold rolling to a final gauge.

20. The method of clause 16, wherein the step of rolling the composite is conducted by cold rolling directly to a final gauge and then subjected to a final anneal in a temperature range of 150-420° C.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated. All such variations and modifications are intended to be included within the scope of the appended claims.

We claim:

1. A sheet material comprising:
   an aluminum alloy core consisting of 0.1 to 1.2 wt % Si, up to 0.6 wt % Fe, 1.53 to 2.6 wt % Cu, 0.5 to 1.8 wt % Mn, up to 0.6 wt % Mg, 0.05 to 1.0 wt % Zn, up to 0.2 wt % Ti, up to 0.2 wt % Zr, Al, and impurities;
   a 4XXX aluminum alloy braze liner comprising 6 to 13 wt % Si, up to 0.8 wt % Fe, up to 0.3 wt % Cu, up to 0.2 wt % Mn, up to 2.0 wt % Mg, and up to 4.0 wt % Zn; and
   a waterside liner comprising 0.1 to 1.2 wt % Si, up to 1.0 wt % Fe, up to 0.3 wt % Cu, up to 1.5 wt % Mn, up to 0.6 wt % Mg, 0.5 to 12 wt % Zn, up to 0.16 wt % Ti, and up to 0.16 wt % Zr.

2. The sheet material of claim 1, wherein the Zn of the core forms second phase particles which alter a corrosion potential difference between a matrix of the core and the second phase particles.

3. The sheet material of claim 2, wherein the Zn of the core forms at least one of $Cu_5Zn_2Al$, $Cu_3ZnAl_3$ or another Al—Cu—Zn/Al—Cu—Mg—Zn phase.

4. The sheet material of claim 2, wherein the core consists of 0.1 to 1.0 wt % Si, up to 0.6 wt % Fe, 1.53 to 2.4 wt % Cu, 0.5 to 1.7 wt % Mn, up to 0.6 wt % Mg, 0.05 to 1.0 wt % Zn, up to 0.2 wt % Ti, up to 0.2 wt % Zr, Al, and impurities.

5. The sheet material of claim 2, wherein the core consists of 0.1 to 0.8 wt % Si, up to 0.6 wt % Fe, 1.53 to 2.3 wt % Cu, 0.5 to 1.5 wt % Mn, up to 0.4 wt % Mg, 0.05 to 0.8 wt % Zn, up to 0.18 wt % Ti, up to 0.18 wt % Zr, Al, and impurities.

6. The sheet material of claim 1
   wherein the core consists of 0.1 to 0.8 wt % Si, up to 0.6 wt % Fe, 1.53 to 2.3 wt % Cu, 0.5 to 1.5 wt % Mn, up to 0.4 wt % Mg, 0.1 to 0.8 wt % Zn, up to 0.18 wt % Ti, up to 0.18 wt % Zr, Al, and impurities.

7. The sheet material of claim 1, wherein the waterside liner comprises 0.1 to 1.2 wt % Si, up to 1.0 wt % Fe, up to 0.2 wt % Cu, up to 1.5 wt % Mn, up to 0.6 wt % Mg, 0.5 to 12 wt % Zn, up to 0.16 wt Ti, and up to 0.16 wt % Zr; and
   wherein the core consists of 0.1 to 0.8 wt % Si, up to 0.5 wt % Fe, 1.53 to 2.3 wt % Cu, 0.5 to 1.5 wt % Mn, up to 0.35 wt % Mg, 0.05 to 0.8 wt % Zn, up to 0.2 wt % Ti, up to 0.2 wt % Zr, Al, and impurities.

8. The sheet material of claim 1, wherein the waterside liner comprises 0.1 to 1.2 wt % Si, up to 0.8 wt % Fe, up to 0.1 wt % Cu, up to 1.3 wt % Mn, up to 0.5 wt % Mg, 0.5 to 10 wt % Zn, up to 0.1 wt % Ti, and up to 0.1 wt % Zr; and
   wherein the core consists of 0.1 to 0.8 wt % Si, up to 0.5 wt % Fe, 1.53 to 2.3 wt % Cu; 0.5 to 1.4 wt % Mn, up to 0.3 wt % Mg, 0.05 to 0.8 wt % Zn, up to 0.18 wt Ti, up to 0.18 wt % Zr, Al, and impurities.

9. The sheet material of claim 1, further comprising an interliner positioned between the core and the braze liner.

10. The sheet material of claim 9, wherein the interliner comprises up to 0.3 wt % Si, up to 0.5 wt % Fe, 0.1 to 1.0 wt % Cu, 0.5 to 1.8 wt % Mn, up to 0.3 wt % Mg, up to 0.25 wt % Zn, up to 0.25 wt % Ti, and up to 0.25 wt % Zr;
   wherein the waterside liner comprises 0.1 to 1.2 wt % Si, up to 1.0 wt % Fe, up to 0.2 wt % Cu, up to 1.5 wt % Mn, up to 0.6 wt % Mg, 0.5 to 12 wt % Zn, up to 0.16 wt % Ti, and up to 0.16 wt % Zr; and
   wherein the core consists of 0.1 to 1.0 wt % Si, up to 1.0 wt % Fe, 1.53 to 2.5 wt % Cu, 0.5 to 1.8 wt % Mn, up to 0.6 wt % Mg, 0.05 to 1.0 wt % Zn, up to 0.2 wt % Ti, up to 0.2 wt % Zr, Al, and impurities.

11. The sheet material of claim 9, wherein the interliner comprises up to 0.2 wt % Si, up to 0.5 wt % Fe, 0.3 to 0.9 wt % Cu, 0.5 to 1.8 wt % Mn, up to 0.35 wt % Mg, up to 0.2 wt % Zn, up to 0.18 wt % Ti, and up to 0.18 wt % Zr;
   wherein the waterside liner comprises 0.1 to 1.0 wt % Si, up to 1.0 wt % Fe, up to 0.2 wt % Cu, up to 1.2 wt % Mn, up to 0.5 wt % Mg, 0.5 to 10 wt % Zn, up to 0.1 wt % Ti, and up to 0.1 wt % Zr; and
   wherein the core consists of 0.1 to 0.8 wt % Si, up to 0.5 wt % Fe, 1.53 to 2.5 wt % Cu, 0.5 to 1.6 wt % Mn, up to 0.3 wt % Mg, 0.05 to 0.8 wt % Zn, up to 0.18 wt % Ti, up to 0.18 wt % Zr, Al, and impurities.

12. The sheet material of claim 9, wherein the interliner comprises up to 0.15 wt % Si, up to 0.4 wt % Fe, 0.2 to 0.9 wt % Cu, 0.5 to 1.7 wt % Mn, up to 0.3 wt % Mg, up to 0.15 wt % Zn, up to 0.16 wt % Ti, and 0.1 to 0.16 wt % Zr;
   wherein the waterside liner comprises 0.1 to 1.0 wt % Si, up to 0.9 wt % Fe, up to 0.2 wt % Cu, up to 1.4 wt % Mn, up to 0.5 wt % Mg, 0.5 to 8 wt % Zn, up to 0.1 wt % Ti, and up to 0.1 wt Zr; and
   wherein the core consists of 0.1 to 0.8 wt % Si, up to 0.5 wt % Fe, 1.53 to 2.3 wt % Cu, 0.5 to 1.5 wt % Mn, up to 0.3 wt % Mg, 0.05 to 0.8 wt % Zn, up to 0.18 wt % Ti, up to 0.18 wt % Zr, Al, and impurities.

13. A heat exchanger comprising:
   at least one tube capable of conducting a fluid therethrough and at least one fin in heat conductive contact with the tube, the tube comprising the sheet material of claim 1;
   wherein the fin comprising an aluminum alloy with a Zn addition; and
   wherein the Zn of the core reduces the corrosion potential difference between the tube and the fin.

14. The heat exchanger of claim 13, wherein the fin comprises a 3003+Zn/3003mod aluminum alloy comprising ≥0.5 wt % Zn addition.

15. A method for making the sheet material of claim 10, the method comprising:
   casting ingots for the interliner, the waterside liner, the core, and the braze liner;
   subjecting the ingots for the interliner, the waterside liner, the core, and the braze liner to a preheat at a temperature in a range of 400-560° C. for a soak time of up to 6 hours;
   rolling the ingots for the interliner, the waterside liner, the core, and the braze liner to form stackable laminae;
   stacking the laminae into a composite; and
   rolling the composite to form the sheet material.

16. The method of claim 15, wherein the rolling the composite is conducted at a temperature in a range of 400-520° C.

17. The method of claim 15, wherein the rolling the composite is conducted at room temperature.

18. The method of claim 15, wherein the rolling the composite is conducted by cold rolling to an intermediate gauge followed by an intermediate anneal at a temperature in a range of 340-420° C. one or more times, followed by cold rolling to a final gauge.

19. The method of claim 15, wherein the rolling the composite is conducted by cold rolling directly to a final gauge and then subjecting to a final anneal at a temperature in a range of 150-420° C.

* * * * *